(12) United States Patent
Qureshi

(10) Patent No.: US 6,934,608 B2
(45) Date of Patent: Aug. 23, 2005

(54) INTEGRATED VERTICAL SITUATION DISPLAY

(75) Inventor: Hisham M. Qureshi, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 18 days.

(21) Appl. No.: 10/616,836

(22) Filed: Jul. 9, 2003

(65) Prior Publication Data

US 2005/0010359 A1 Jan. 13, 2005

(51) Int. Cl.[7] .............................. G09G 5/08; G06F 3/14; G06F 17/00
(52) U.S. Cl. ............................. 701/4; 701/14; 701/200; 340/977
(58) Field of Search ............................. 701/4, 14, 200, 701/207, 211, 11, 302, 206; 244/175, 194; 340/973, 977, 979

(56) References Cited

U.S. PATENT DOCUMENTS 6,085,129 A * 7/2000 Schardt et al. ................ 701/14
6,112,141 A * 8/2000 Briffe et al. ................... 701/14
6,154,151 A * 11/2000 McElreath et al. .......... 340/970
6,389,355 B1 * 5/2002 Gibbs et al. ................. 701/206
6,690,298 B1 * 2/2004 Barber et al. ................ 340/971
6,720,891 B2 * 4/2004 Chen et al. .................. 340/969
2002/0143439 A1   10/2002 Mortzel et al.

* cited by examiner

*Primary Examiner*—Michael J. Zanelli

(57) ABSTRACT

Methods and apparatus are provided for generating an integrated vertical situation display. The method comprises generating a profile view frame, producing a first profile view of a first track of the vehicle in the profile view frame beginning at about a current position of the vehicle and ending at about a predetermined location, and extending a second profile view of a second track of the vehicle from about the predetermined location. The apparatus comprises a display configured to display a profile view frame and a specially configured processor coupled to the display. The processor is configured to produce a first profile view relating to a first track of the vehicle beginning at about a current position of the vehicle and ending at a predetermined location, and generate a second profile view relating to a second track of the vehicle extending from about the predetermined location.

28 Claims, 6 Drawing Sheets

COMBINED TRACK-FP PROJECTED PROFILE VIEW

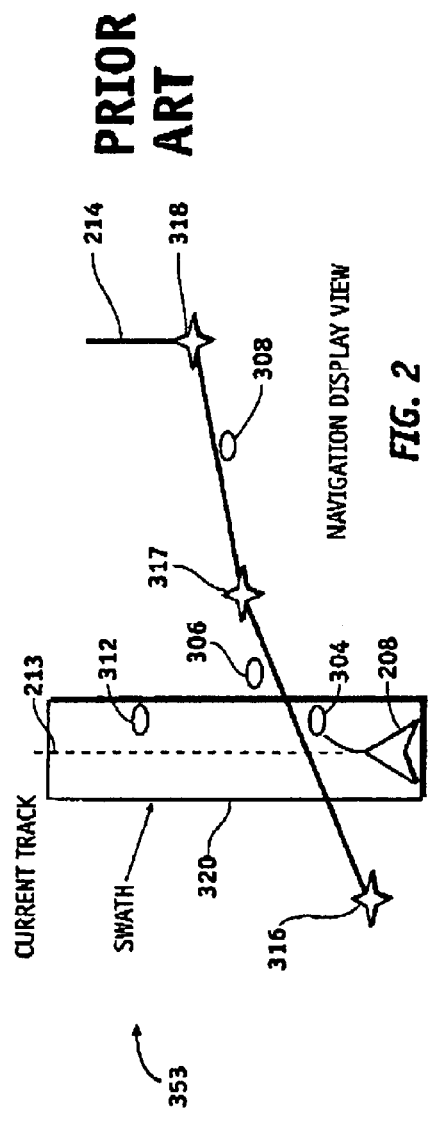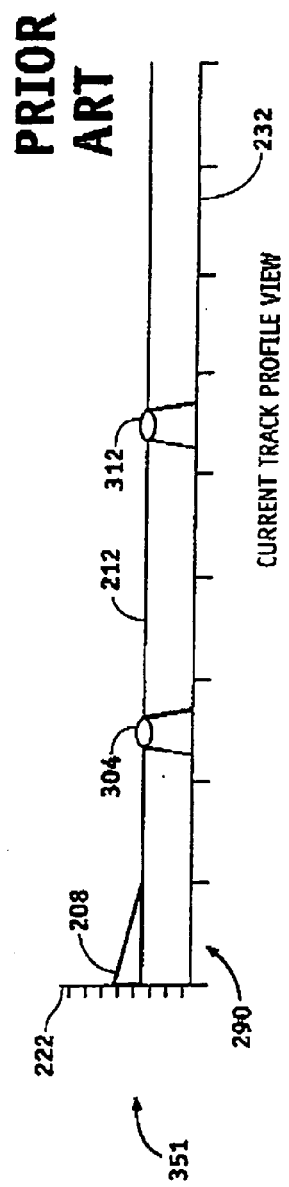

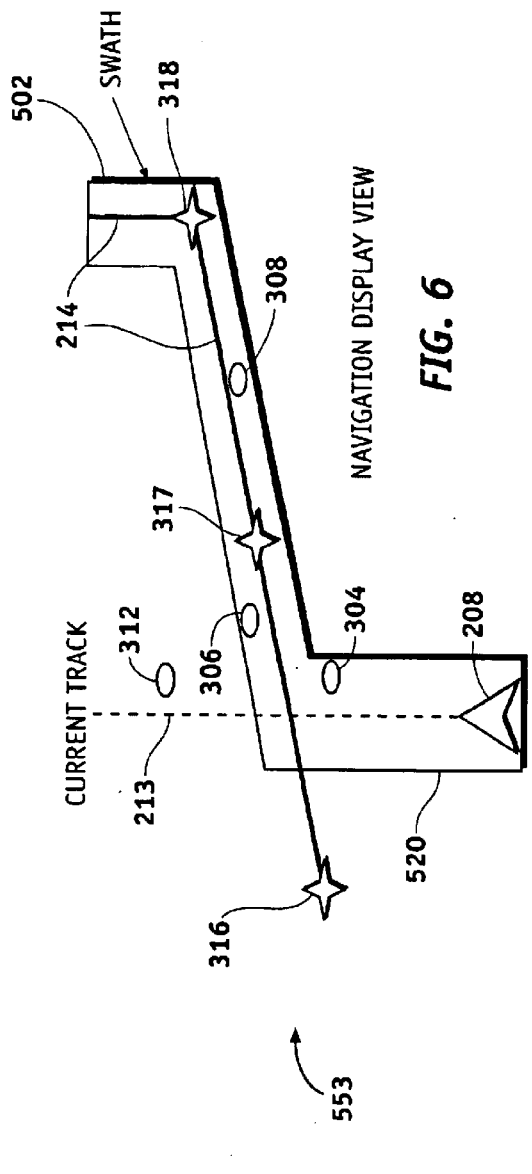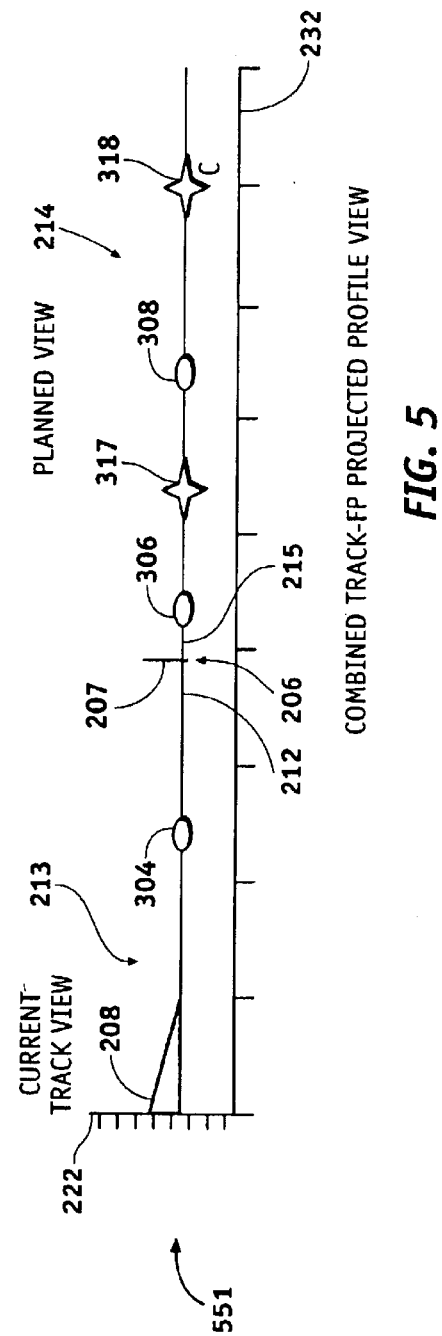

INTEGRATED VERTICAL SITUATION DISPLAY

TECHNICAL FIELD

The present invention generally relates to aircraft flight deck displays, and more particularly relates to a vertical situation display.

BACKGROUND

Aircraft pilots us information about local terrain or man-made obstacles during flight. Current vertical situation displays provide some of the needed information in a profile view. The profile view generally has a frame including a vertical axis showing altitude and a horizontal axis which may show distance along track. An aircraft icon is typically located near the vertical axis and a line representing a vertical flight profile of the aircraft is extended from the aircraft icon. Two such vertical flight profile views of the aircraft are known: a current-track profile and a planned-track profile.

FIG. 1 shows a diagram of a prior art vertical situation display (VSD) 351 that is configured to produce one of the current-track profile and the planned-track profile and a related lateral situation display 353 is shown in FIG. 2. Referring to FIG. 1 and FIG. 2, VSD 351 includes a profile view frame 290 having a vertical axis 222 and/or a horizontal axis 232. Axis 222 and 232 may be graduated and scaled for altitude and distance, respectively. Aircraft icon 208 conventionally remains horizontally stationary but may tilt to show an assent or descent. The current track profile 212, which is a projection of the current flight path 213 onto a vertical plane, is shown in relation to obstacles 312 and 304, which may be buildings, terrain features, or even restricted flight zones within a swath 320 of the current flight path 213 of the aircraft as shown in FIG. 2. Obstacles need not impinge upon the current track profile 212 to be shown on the VSD 351. The width of the swath 320 may vary according to flight safety rules, depending upon the airspace in which aircraft is flying.

Lateral display 353 shows the current flight path 213, also referred to as the current track, which is a view of the flight path of the aircraft in a horizontal plane. The aircraft is represented by icon 208 and the related swath 320 containing vertical obstacles 312 and 304. Lateral display 353 also shows a planned track 214 related to a flight plan of the aircraft. The planned track 214 has multiple waypoints 316–318, which may be points at which the aircraft turns. The planned track 214 has vertical obstacles 306 and 308. Even when the pilot desires to turn the aircraft represented by icon 208 from the current track 213 onto the planned track 214, the vertical obstacles 306 and 308 in the planned track 214 are not displayed on the VSD 351 in a current track view. VSD 351 only presents the vertical obstacles 304 and 312 in the current track 213 as shown in FIG. 1.

Conversely, if a pilot selects a planned track view as shown in FIG. 3 and FIG. 4, vertical obstacles 304 and 312 in the current track 213 are not displayed on the VSD 451, and the VSD 451 only presents the vertical obstacles 306 and 308 in the planned track.

Having only one type of vertical situation display at a time involves efforts of the pilot in assimilating information related to the current track view and the planned track view. However, as displays have continued to advance in sophistication and have achieved increasingly higher levels of information, methods and apparatus are sought to reduce the efforts of the pilot in assimilating aircraft information, including the vertical situation of the aircraft. Accordingly, methods and apparatus are sought to reduce the effort associated with assimilating separate and independent presentations of the current track and the planned track in the VSD.

Accordingly, it is desirable to condense and simplify displayed vertical situation information. Furthermore, other desirable features and characteristics of the present invention will become apparent from the subsequent detailed description and the appended claims, taken in conjunction with the accompanying drawings and the foregoing technical field and background.

BRIEF SUMMARY

A method of displaying a vertical situation of a vehicle comprising the step of generating one profile view frame in which begins a first vertical profile view of a first track of the vehicle at about a point in the profile view frame indicative of a current position of the vehicle. The first vertical profile view ends at about a point in the profile view frame indicative of a predetermined location and a second vertical profile view of a second track of the vehicle extends from about the point in the profile view frame indicative of the predetermined location. The first track is a current track and the; second track is a planned track.

An apparatus for displaying a vertical situation of a vehicle, the apparatus configured to generate a visual representation of the vertical situation of the vehicle. The apparatus comprising a display and a processor that is configured to at least partially control the display during presentation of the vertical situation of the vehicle, said processor configured to at least partially control the display to generate one profile view frame, begin a first vertical profile view of a first track of the vehicle at about a point in the profile view frame indicative of a current position of the vehicle, end said first vertical profile view of the current track at about a point in the profile view frame indicative of a predetermined location, and extend a second vertical profile view of a planned track of the vehicle from about the point in the profile view frame indicative of the predetermined location.

BRIEF DESCRIPTION OF THE DRAWINGS

The present invention will hereinafter be described in conjunction with the following drawing figures, wherein like numerals denote like elements;

FIG. 1 is a diagram of a prior art display scheme showing a profile view for a current track FIG. 2 is a diagram of a prior art display scheme showing a lateral view for a current track;

FIG. 5 is a diagram of an exemplary integrated vertical situation display showing a profile view for a current track integrated with a planned track;

FIG. 6 is a diagram of an exemplary integrated vertical situation display showing a lateral view for a current track integrated with a planned track;

DETAILED DESCRIPTION

Figure 4:
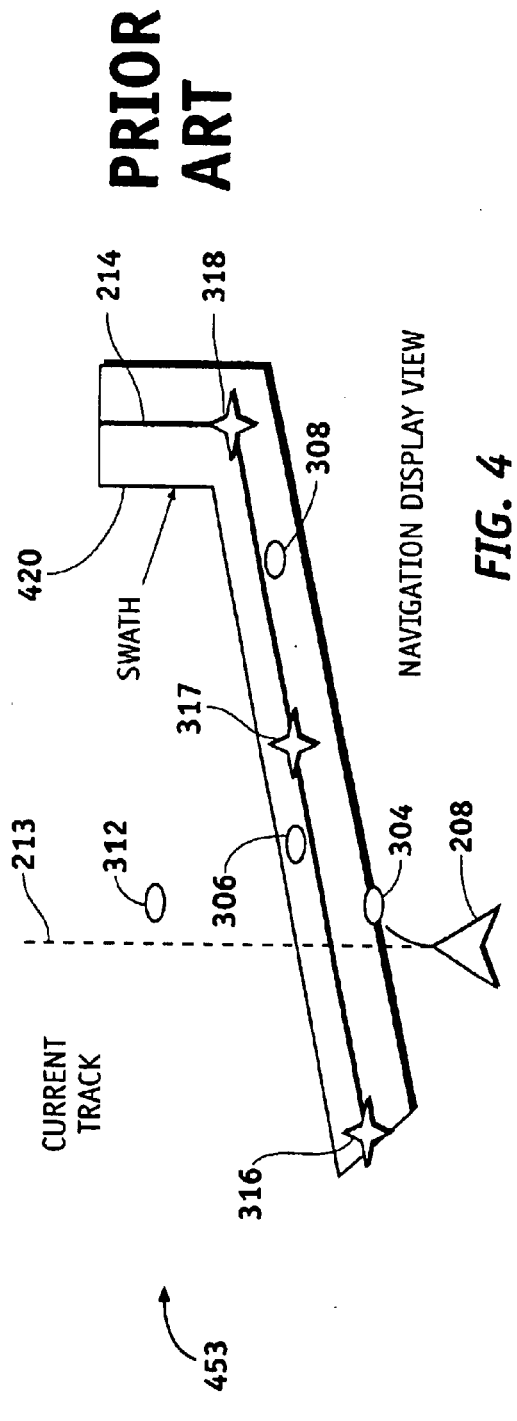
FIG. 4 is a diagram of a prior art display scheme showing a lateral view for a planned track.
Figure 3:
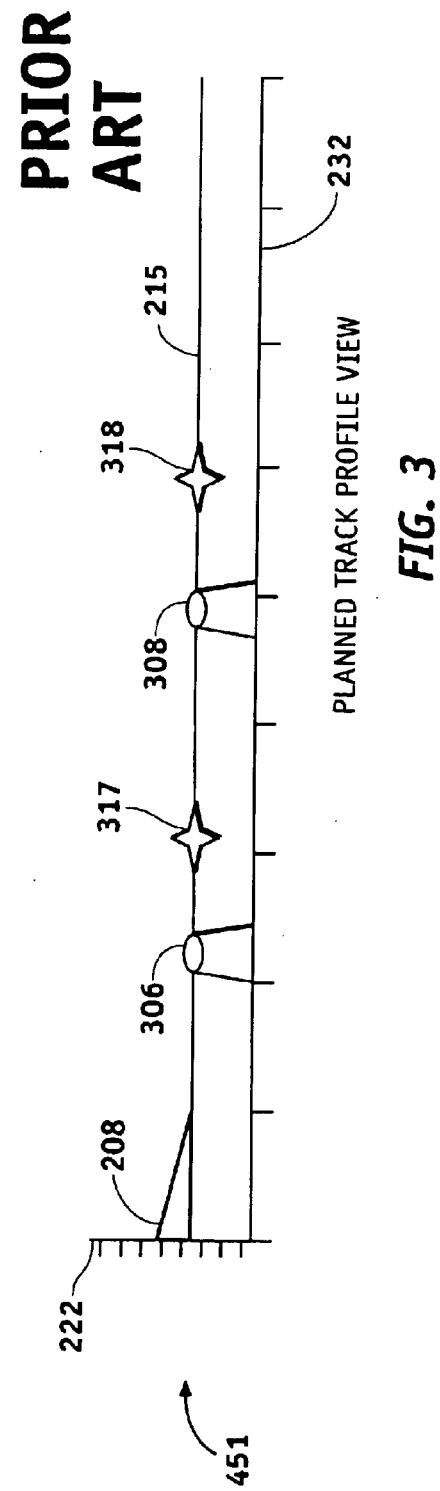
FIG. 3 is a diagram of a prior art display scheme showing a profile view for a planned track.

The following detailed description is merely exemplary in nature and is not intended to limit the invention or the application and uses of the invention. Furthermore, there is no intention to be bound by any expressed or implied theory presented in the preceding technical field, background, brief summary or the following detailed description. Moreover, while the detailed description is directed to an aircraft, the present invention is applicable to other land, water, air or space vehicles and non-vehicle applications. For example, the present invention is applicable to simulators, video games, and laptop and desktop computers that utilize a display for visual presentation of vertical situations.

Referring to FIG. 5 and FIG. 6, FIG. 5 shows an exemplary embodiment of an integrated VSD 551. A profile view 212 of the current track 213 is shown up to predetermined location 206, along with the vertical obstacle 304 within swath 520 up to the predetermined location 206. Extending beyond predetermined location 206 is a profile view 215 of planned track 214 and the vertical obstacles 306 and 308 within swath 502 up to the limit of the planned track 214 or the range setting of the VSD 551, whichever is less. The predetermined location 206 has an icon 207, which may be a vertical line 207, as shown. Other icons 207 are contemplated, including a first color for current track profile 212 and a second color for planned track profile 215 and its way points. Vertical obstacles, such as 304, 306, and 308, which are within a swath 520 or 502 as shown in FIG. 6, are displayed in VSD 531 for the respective portions of current track 213 and planned track 214 displayed.

Figure 7:
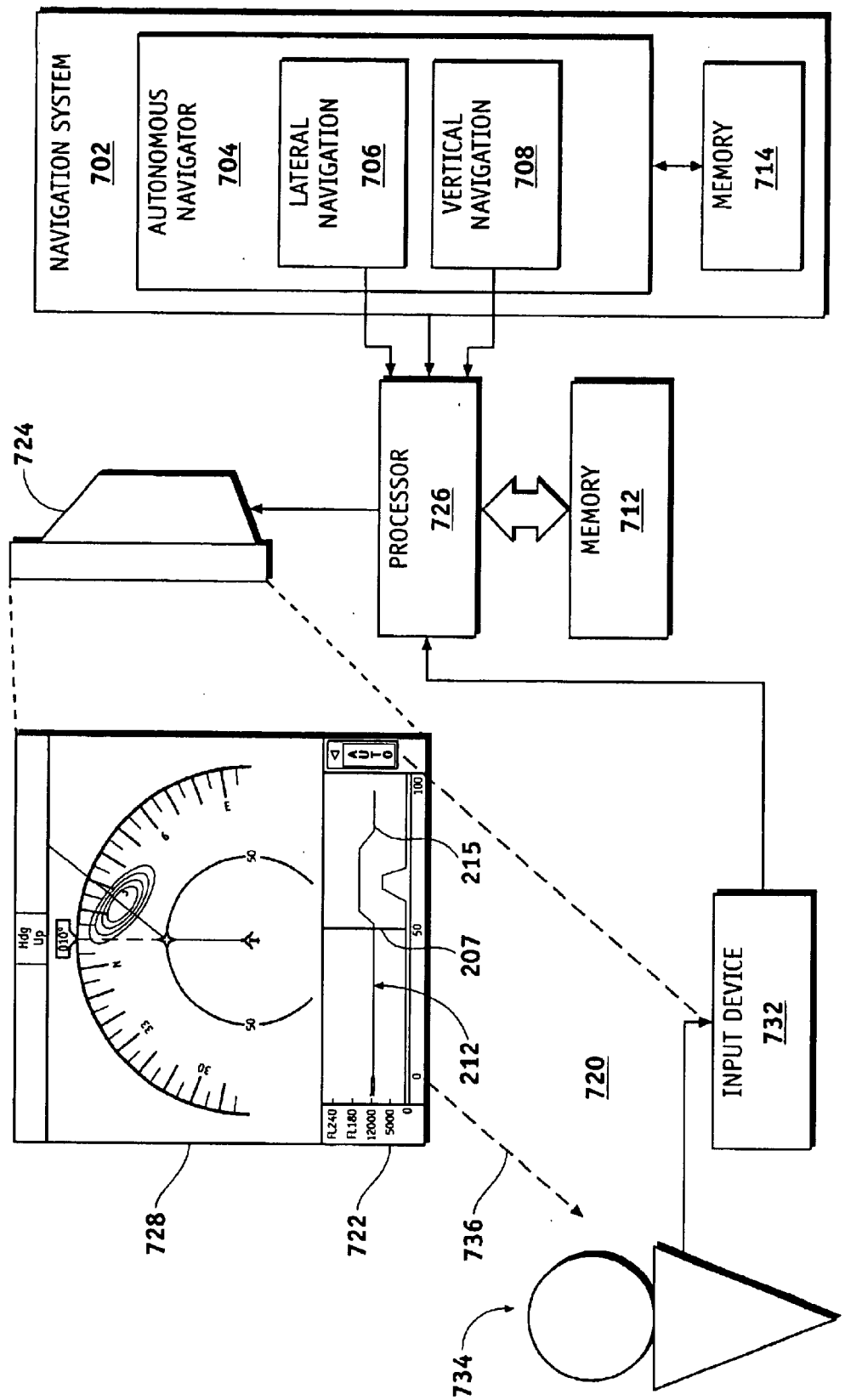
FIG. 7 is a block diagram of an exemplary apparatus for producing an integrated vertical situation display.

FIG. 7 depicts an apparatus 720 for displaying an integrated vertical situation display (VSD) 722 of an aircraft (not shown) according to a preferred exemplary embodiment of the present invention. The apparatus 720 includes a display 724 that is configured to produce a visual representation of the vehicle vertical situation 722. The display 724 can be any current and future display that is suitable for producing a visual representation of the vertical situation 722. For example, the display 724 can be a color Cathode Ray Tube display (CRT), monochrome CRT display, Liquid, Crystal Display (LCD), plasma display, Flat-Panel Display (FPD), electro-luminescent display, vacuum fluorescent display, Heads-Up, Display (HUD), Heads-Down Display (HDD), Helmet Mounted Display (HMD), Light Emitting Diode (LED) display or the like. Display 724 may be an interactive display, such as a touch-screen display or a light-pen display. Display 724 may present a multifunctional display 200 (FIG. 8), including VSD 722 and lateral display 728, to provide visual feedback 736 to pilot 734.

In addition to the display 724, the apparatus 720 has a processor 726 in operable communication with the display 724. The processor 726 is configured to at least partially control the display 724 during production of the visual representation of the vertical situation 722. The processor 726 preferably encompasses one or more functional blocks and can include any number of individual microprocessors, memories, storage devices, interface cards, and other processor components. Processor 726 may be in operable communication with various sources of data, such as memory 712 and navigation system 702. As used herein, memory shall mean any type of memory capable of operable communication with the processor 726. For example and without limitation, memory 712 may include RAM, CD-ROM, memory card, memory stick, disk storage, DVD, and the like, as well as any combination of same. In one embodiment, memory 712 may be primarily dedicated to display functions.

The data to be processed and/or displayed may originate in the navigation system 702, which may have an autonomous navigator 704. Autonomous navigator 704 may be an autopilot, a flight management system (FMS), or other autonomous navigation system used on a ship, submarine, aircraft, wheeled vehicle, and other vehicles using navigation. For the present exemplary embodiment 720, an autonomous navigator 704 for an aircraft is depicted. The autonomous navigator 704 may include a lateral navigation section 706 and a vertical navigation section 708. In some embodiments, the sections 706 and 708 may not be separate. Lateral navigation 706 provides navigation in a plane generally perpendicular to a ray between the aircraft and the center of the Earth, or lateral plane. A visual representation 728 of lateral navigation information is provided by processor 726 on display 724. A visual representation 722 of vertical navigation information, the VSD 722, is also provided by processor 726 on display 724. Vertical navigation 708 provides navigation between various flight points generally along the ray between the aircraft and the center of the Earth. Autonomous navigator 704 may have operable access to a memory 714 for terrain data bases, air navigation charts, and similar navigation data. In some embodiments, memory 714 and 712 may be the same memory.

Figure 8:
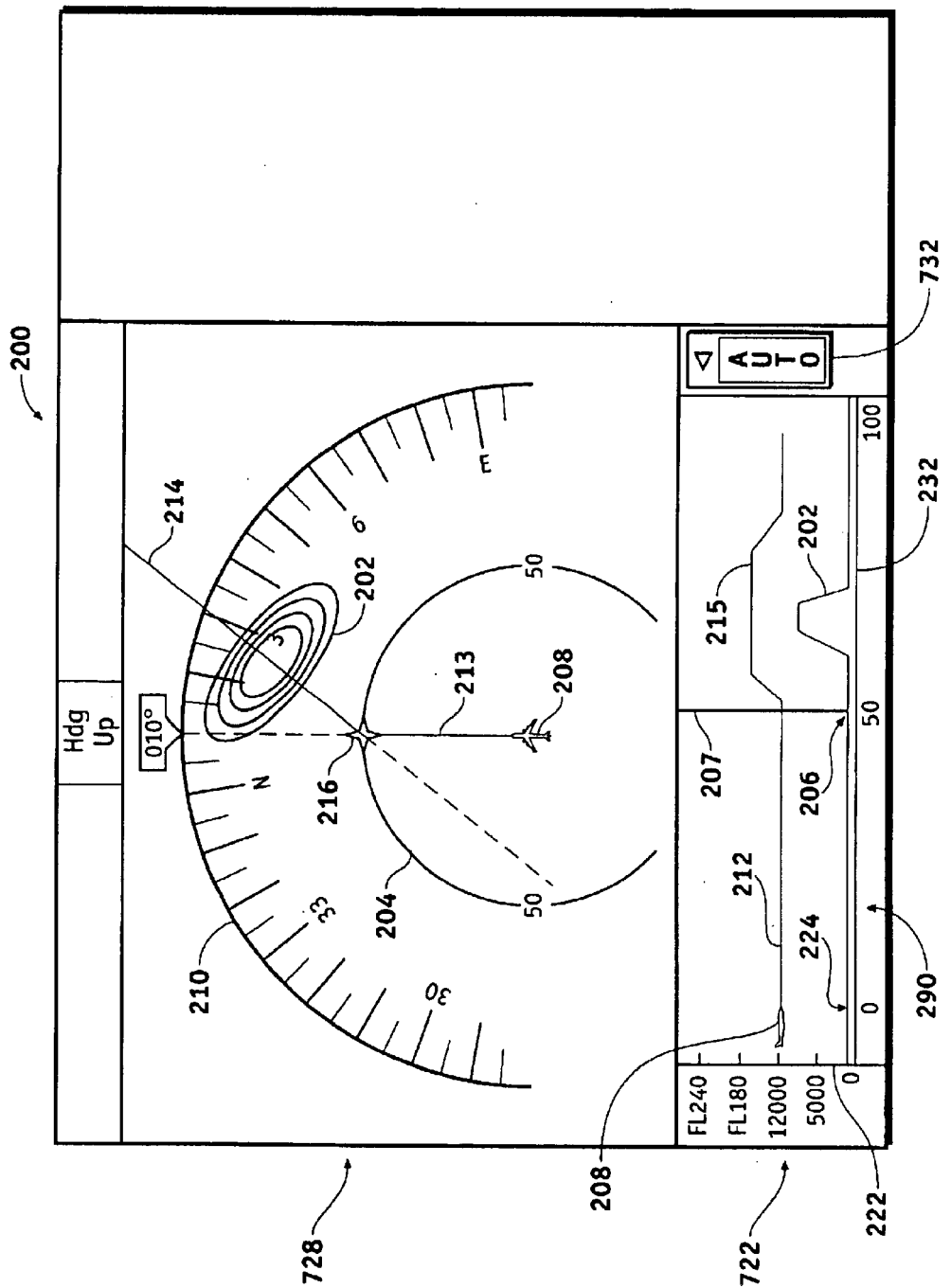
FIG. 8 illustrates an exemplary multifunctional flight display with an exemplary integrated vertical situation display.

Referring additionally to FIG. 8, the processor 726 is configured to at least partially control the display 724 such that the visual representation 722 of the vertical situation has a vertical profile view 212 of a current track 213 of the aircraft that begins at about a current position 224 of the vehicle and ends at about a predetermined location 206. As used herein, current track 213 shall mean a path aligned with the current true heading of the vehicle and extending substantially in the direction of motion. The true heading is the horizontal component of the vehicle velocity vector. The processor 726 is also configured to at least partially control the display such that the VSD 722 has a profile view 215 of a planned track 214 of the vehicle that extends from about the predetermined location 206. The vertical profile views 212 and 215 of both the current track 213 and the planned track 214, respectively, share a common profile view frame 290 having a common vertical axis 222 and a common horizontal axis 232. As used herein, planned track shall mean a path following a planned route of travel. A vehicle may have a planned track 214, which can be a navigation planned track 214, stored in an autonomous navigator 704 as, inter alia, a sequence of waypoints.

FIG. 8 also shows the exemplary embodiment of an integrated VSD 722 made part of multifunctional flight display 200. Multifunctional flight display 200 includes lateral display 728 and integrated VSD 722. Compass 210 indicates that the aircraft represented by icon 208 has a current track 212 with a heading of 10 degrees. The current track 212 intersects a first waypoint 216 of a planned track 214 just beyond the 50-mile range marker 204. The planned track 214 has a vertical guidance component for climbing above vertical obstacle 202 and then descending back to the original altitude, as shown by vertical profile 215. VSD altitude scale 222 shows the aircraft at about 12,000 feet. VSD 722 enables the pilot to see with one glance all of the vertical obstacles in the portions of the combined current track profile 212 and the planned track profile 215 where the aircraft may eventually be navigating.

When no navigation plan is stored in autonomous navigator 702 or if the autonomous navigator 702 is turned off, VSD 722 may display only the current track 212. If a flight plan is stored in an energized autonomous navigator 702 but is not within range of the current track 212 as displayed, VSD 722 may display only the current track 212. If a flight plan is stored in an energized autonomous navigator 702 and some portion of that flight plan is within the range of the current track 212 as displayed, then at least portions of the current track profile 212 and of the planned track profile 215 may be displayed in integrated VSD 722. If the aircraft is in the planned track 214 then VSD 722 may display only planned track profile 215. If the aircraft is in the planned track 214 and near the end of planned track 214, VSD 722 may display planned track profile 215 up to another predetermined location 206 near the end point of the planned track 214, and may display a projected current track profile 212 extending therefrom, based on the expected heading at the end of the planned track 214. For example, an aircraft may fly a current track 213 into a planned track 214 covering a short stretch of tightly-controlled, airspace, and then fly a second current track 212 upon exiting the flight plan. In this example, the VSD 722 may display a first predetermined location 206 relating to the entry point of the planned track profile 215 and a second predetermined location 206 relating to the exit from the planned track profile 215.

In an embodiment, the VSD 722 may be manually switched between current track profile 212, planned track profile 215, and a combined display using switch 732. For example, if the pilot 734 wished to view a planned track profile 215 that was not yet in range of the current display, the pilot 734 may switch to planned track mode using input device 732 to view it. In an embodiment, switching to planned track profile 215 with no planned track 214 in range may automatically produce a range scale adjustment that will include an otherwise out-of-range planned track profile 215. The scales of the lateral display 728 and the VSD 722 are typically linked by a constant proportion, usually unity. In a particular embodiment, input device 732 may be part of a touch-screen display 724, and the switch may be a software device.

Each predetermined location 206 is preferably identified with a visual indicator 207 in VSD 722, which may be a vertical line designator 207 as shown in FIG. 2. However, other designators 207 are contemplated, including a first color for current track 212 and a second color for planned track 214. The predetermined location 206 can be associated with any number of locations associated with the planned track or the current track or the planned track and the current track. In certain embodiments, predetermined location 206 may be a location at which the autonomous navigator 704, or autopilot 704, is predicted to engage under the command of the operator 734. For example, the point at which lateral guidance 706 determines that the aircraft should begin to follow the planned track 214 or begin altering course to follow the planned track 214 may be predetermined location 206. However, other factors can solely influence the predetermined location 206 or influence the predetermined location 206 in combination with other factors. For example and without limitation, restricted flight zones, noise abatement procedures, and maneuvering limitations of the aircraft may be used in determining the predetermined location 206.

Figure 9:
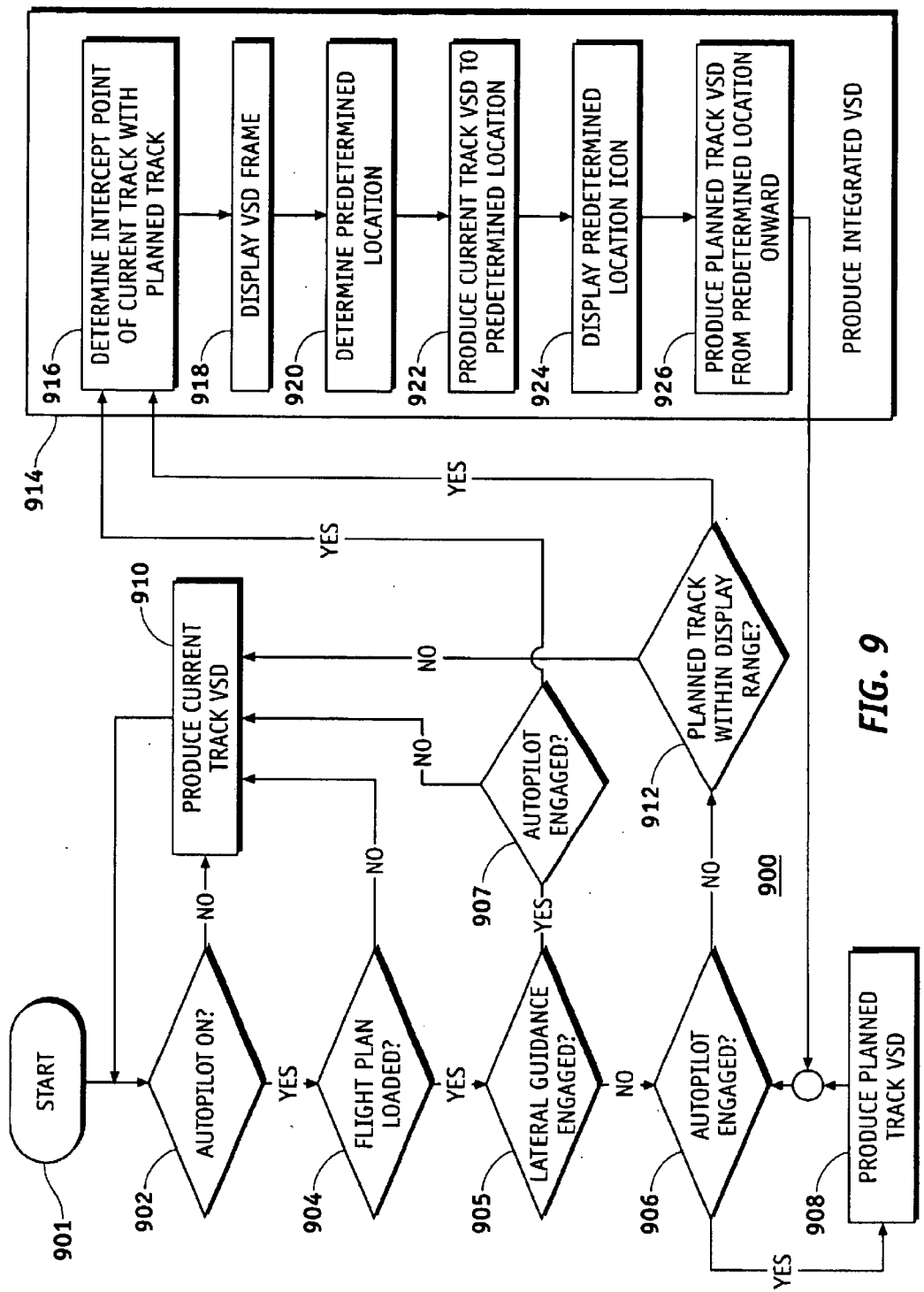
FIG. 9 is a flowchart of an exemplary method of producing an integrated vertical situation display.

FIG. 9 shows a flowchart of an exemplary method 900 of producing an integrated VSD 722. The method 900 begins with power up at step 901. If step 902 determines that the autopilot 704 is not on, then the method produces only a current track profile 212 view in VSD 722 in step 910. Until the autopilot 704 is turned on, the method 900 may continue to loop through the process of producing a current track profile 212 view in VSD 722 in step 910. When the autopilot 704 is energized, step 904 determines if a flight plan has been loaded, or otherwise been designated as an active flight plan. If no flight plan is active, then method 900 may continue to loop through the process of producing a current track profile 212 view in VSD 722 in step 910.

If step 904 determines that there is an active flight plan, step 905 determines if lateral guidance is engaged. Lateral guidance engages when the aircraft is within a predetermined distance of a planned track 214 to give the pilot 734 indications of where to fly the aircraft to intercept the planned track 214. If lateral guidance is determined to be engaged in step 905, step 905 determines if the autopilot is engaged. If both lateral guidance and the autopilot are determined to be engaged, step 914 produces an integrated VSD 722. If the autopilot is determined not to be engaged in step 907, step 910 produces a current track VSD. If lateral guidance is not determined to be engaged in step 905, step 906 determines if the aircraft is presently flying by autopilot 704 along the navigation planned track 214, as indicated by the autopilot 704 being engaged. If the autopilot 704 is engaged, process 900 produces a planned track profile 215 (FIG. 5) view in VSD 722 in step 908, and continues to do so until the autopilot 704 disengages. If the autopilot is not engaged, then step 912 determines whether an intersection between the current track 213 and the navigation planned track 214 will occur within the range currently set for the display. If a point of intersection is not within range, the method 900 may continue to loop through the process of producing a current track profile 212 view in VSD 722 in step 910. If an intersection between the current track 213 and the navigation planned track 214 is within range, then step 914 produces an integrated VSD 722. Step 914 includes step 916, which is the step of determining the intercept point of the current track 213 and the navigation planned track 214 in the lateral plane. In some embodiments, an altitude match may also be required. Note that step 916 may be performed as part of step 912, and that repetition of the calculation may not be required.

In step 918, a VSD 722 profile view frame 290 (FIG. 8) with its horizontal and vertical axes 222 and 232 may be produced on a display screen 724. The display screen 724 may be a dedicated screen or part of a multifunctional flight display or similar multi-framed video display. Step 920 determines the predetermined location 206. As discussed above, several approaches are possible. In a particular embodiment, the intersection point may be accepted by the autopilot 704 as a waypoint, and the lateral guidance logic 706 in the autopilot 704 may then be used to predict the point at which the aircraft may engage the autopilot 704 to begin a turn onto the navigation planned track 214. That predicted point of engagement may be used as predetermined location 206. In another particular embodiment, vertical separation between the current track 213 and the navigation planned track 214 may be factored in by accessing vertical guidance logic 708 for backing out the time to climb (or descend) to the navigation planned track 214 altitude to predict the point of autopilot 704 engagement as the predetermined location 206. Those of ordinary skill in the art of aircraft autonomous navigation may appreciate other factors that may influence a point of autopilot engagement and may know how to incorporate them.

Step 922 produces a current track profile 212 view within the VSD 722 profile view frame 290 created in step 918 from the current aircraft location given by icon 208 to the predetermined location 206. The current track profile 212 view includes any vertical obstacles 304 within a current track swath 520 (FIG. 6) between the aircraft present position 224 and the predetermined location 206. Step 924 may display an icon 207 indicating the predetermined location 206 in the VSD 722 profile view frame 290 created in step 918 and located at approximately the end of the current track profile 212 view therein. Step 926 produces the navigation planned track profile 215 view in the VSD 722 profile view frame 290 created in step 918 extending from the end of the current track profile 212 view to the end of the flight plan, the end of the current range setting, or other predetermined endpoint. Process 900 may continue to cycle through steps 906, 912, and 914 to produce the integrated VSD 722 until the autopilot 704 engages, the planned track 214 is out of range, the flight plan is deactivated, the autopilot 704 de-energized, or the navigation system 702 is powered off.

In an alternate embodiment, a system having the capability to produce independent current track profile 212 views and navigation planned track profile 215 views, may be modified to produce an integrated VSD 722. The current track profile 212 view may be placed in a display window or frame as are known in the art, configured to display only the portion of the current track profile 212 view between the present aircraft position 224 and the predetermined location 206. The navigation planned track 214 profile view may be placed in a second window or frame, equally scaled to the current track window, and then configured to display only the portion of the navigation planned track 214 profile view extending from the predetermined location 206 onward. The two windows may then be juxtaposed in a profile view frame 290 to create an integrated VSD 722 having a common scale. In another alternate embodiment, the abbreviated navigation planned track 214 profile view may be displayed in a window overlaid on the end of the current track profile 212 view in the VSD frame. Those of ordinary skill in the art in computer-driven displays may appreciate, in light of this disclosure, the various windowing approaches which may be used to align multiple track profiles to a common frame 290.

While the exemplary embodiment has been described in terms of a transition from a current track 212 to a planned track 214, the invention also contemplates transitions between two or more planned tracks 214, such as an old and a new planned track 214, or any sequence of periods of manual flight and periods of autonomously navigated flight producing current track profiles 212 and planned track profiles 215, respectively.

In an alternate embodiment of the method 900, a current track VSD may be created in step 914 (instead of step 910) by artificially placing the predetermined location at the maximum range of the display, and a planned track may be created in step 914 (instead of step 908) by artificially placing the predetermined location at the current location 224.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method of displaying a vertical situation of a vehicle, the method comprising the steps of:
   generating one profile view frame;
   in the profile view frame, beginning a first vertical profile view of a first track of the vehicle at about a point in the profile view frame indicative of a current position of the vehicle;
   ending said first vertical profile view of the current track at about a point in the profile view frame indicative of a predetermined location; and
   extending a second vertical profile view of a second track of the vehicle from about the point in the profile view frame indicative of the predetermined location,
   wherein the first track is a current track and the second track is a planned track.

2. The method of claim 1, further comprising the step of first determining the predetermined location.

3. The method of claim 2, wherein said step of determining the predetermined location comprises determining a location relating to an intersection of the first track of the vehicle and the second track of the vehicle.

4. The method of claim 2, wherein said step of determining the predetermined location comprises determining a location corresponding to a predicted engagement of an autonomous navigator that is configured to steer the vehicle substantially along said planned track.

5. The method of claim 1, further comprising the step of replacing said second vertical profile view of said second track with said first vertical profile view of said first track if the predetermined location is unknown.

6. The method of claim 1, wherein said vehicle is an aircraft.

7. An apparatus for displaying a vertical situation of a vehicle, comprising:
   a display that is configured to generate a visual representation of the vertical situation of the vehicle; and
   a processor that is configured to at least partially control said display during presentation of the vertical situation of the vehicle, said processor configured to at least partially control said display to:
   generate one profile view frame;
   begin a first vertical profile view of a first track of the vehicle at about a point in the profile view frame indicative of a current position of the vehicle;
   end said first vertical profile view of the first track at about a point in the profile view frame indicative of a predetermined location; and
   extend a second vertical profile view of a planned track of the vehicle from about the point in the profile view frame indicative of the predetermined location.

8. The apparatus of claim 7, wherein the processor is further configured to determine the predetermined location.

9. The apparatus of claim 8, further comprising a memory coupled to the processor, the memory configured to store a navigation play including a navigation plan track.

10. The apparatus of claim 9, wherein the processor is further configured to determine a point of intersection between the current track of the vehicle and the navigation plan track.

11. The apparatus of claim 10, wherein the processor is further configured to determine the predetermined location at least in part by using the point of intersection as a way-point in the navigation plan.

12. The apparatus of claim 8, wherein the profile view frame comprises a vertical profile view frame associated with a lateral situation display having a predetermined range limit, wherein the second profile view extends from the predetermined location to the predetermined range limit obtained from the associated lateral situation display.

13. The apparatus of claim 8, wherein the processor is further configured to display only a first profile view for a current track when no predetermined location can be determined.

14. The apparatus of claim 13, wherein the processor is further configured to display only a second profile view for a planned track when no predicted point can be determined and the vehicle is under the control of an autonomous navigation system.

15. The apparatus of claim 7, wherein the first track is a current track and a second track is a planned track.

16. The apparatus of claim 15, wherein the processor is further configured to determine a location relating to an intersection of the first track of the vehicle and the second track of the vehicle.

17. The apparatus of claim 16, wherein the vehicle comprises an autonomous navigation system, the processor further configured to predict a point of engagement of the autonomous navigation system as the predetermined location.

18. The apparatus of claim 17, wherein the autonomous navigation system comprises an autopilot including navigation logic.

19. The apparatus of claim 18, wherein the processor is further configured to access the logic within the autopilot to predict the point of autopilot engagement.

20. The apparatus of claim 18, wherein the processor is further configured to display only an along-current track profile view from a current vehicle position onward when the autopilot is not energized.

21. The apparatus of claim 7, wherein the vehicle comprises an aircraft.

22. The apparatus of claim 21, wherein the display comprises a multifunctional flight display.

23. A program product comprising:
   (A) a vertical situation display program executable to generate a profile view frame containing a first track profile view from about a current vehicle position to about a predetermined location, together with a profile view of a second track of the vehicle extending from the predetermined location onward; and
   (B) signal bearing media bearing the vertical situation display program.

24. The program product of claim 23, wherein the vertical situation display program comprises code further executable to determine the predetermined location.

25. The program product of claim 24, wherein the vehicle comprises an autonomous navigation system, the vertical situation display program comprising code further executable to predict a point of engagement of the autonomous navigation system.

26. The program product of claim 25, wherein the autonomous navigation system includes navigation logic, wherein the vertical situation display program comprises code further executable to access the navigation logic of the autonomous navigation system.

27. The program product of claim 24, wherein the vertical situation display program comprises code further executable to determine an intersection of the first vehicle track and a second vehicle track.

28. The program product of claim 24, wherein the vertical situation display program comprises a program adapted for an aircraft.

* * * * *